United States Patent
Venugopal et al.

(10) Patent No.: US 11,716,113 B2
(45) Date of Patent: Aug. 1, 2023

(54) FREQUENCY PRE-COMPENSATION FOR HIGH-SPEED TRAIN SINGLE FREQUENCY NETWORKS

(71) Applicant: QUALCOMM INCORPORATED, San Diego, CA (US)

(72) Inventors: Kiran Venugopal, Raritan, NJ (US); Wooseok Nam, San Diego, CA (US); Sungwoo Park, Seoul (KR); Tianyang Bai, Somerville, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/301,613

(22) Filed: Apr. 8, 2021

(65) Prior Publication Data

US 2021/0320685 A1 Oct. 14, 2021

Related U.S. Application Data

(60) Provisional application No. 63/008,562, filed on Apr. 10, 2020.

(51) Int. Cl.
*H04B 1/62* (2006.01)
*H04L 5/00* (2006.01)
(Continued)

(52) U.S. Cl.
CPC .............. *H04B 1/62* (2013.01); *H04L 5/0048* (2013.01); *H04W 24/08* (2013.01); *H04W 72/23* (2023.01)

(58) Field of Classification Search
CPC .. H04L 5/0048; H04W 72/042; H04W 24/08; H04B 1/62
See application file for complete search history.

(56) References Cited

U.S. PATENT DOCUMENTS

2020/0374079 A1* 11/2020 Chervyakov ....... H04L 27/2666

OTHER PUBLICATIONS

CMCC: "Motivation for NR Enhancement for High Speed Train Scenario", 3GPP Draft, 3GPP TSG RAN Meeting #84, RP-191208, 3rd Generation Partnership Project (3GPP), Mobile Competence Centre, 650, Route Des Lucioles, F-06921, Sophia-Antipolis Cedex, France, vol. TSG RAN, No. Newport Beach, USA; Jun. 3, 2019-Jun. 6, 2019, Jun. 2, 2019 (Jun. 2, 2019), XP051747418,4 pages, Retrieved from the Internet: URL: http://www.3gpp.org/ftp/Meetings%5F3GPP%5FSYNC/RAN/Docs/RP%2D191208%2Ezip [retrieved on Jun. 2, 2019] section 3, the Whole Document.

(Continued)

*Primary Examiner* — Elton Williams
(74) *Attorney, Agent, or Firm* — Haynes and Boone, LLP

(57) ABSTRACT

Wireless communication devices, systems, and methods related to mechanisms for transmitting and receiving reference signals in a high-speed train (HST) single frequency network (SFN). A base station (BS) determines a first frequency pre-compensation value for a reference signal transmitted via a first transmission and reception point (TRP) and a second frequency pre-compensation value for a reference signal via a second TRP. The BS notifies a user equipment (UE) of the first and second pre-compensation values through at least one of the TRPs. The BS applies the first pre-compensation value to the reference signal via the first TRP and the second pre-compensation value to the reference signal via the second TRP. The UE adjusts its tracking loop for the reference signal based on the pre-compensation values, reducing estimation and/or search overhead at the UE.

30 Claims, 8 Drawing Sheets

(51) Int. Cl.
 *H04W 24/08* (2009.01)
 *H04W 72/23* (2023.01)

(56) References Cited

OTHER PUBLICATIONS

Huawei, et al., "On UE Demod Performance for LTE HST Rel-16", 3GPP Draft, 3GPP TSG-RAN WG4 Meeting #91, R4-1 906789, ON Demod Performance for LTE HST REL-16, 3rd Generation Partnership Project (3GPP), Mobile Competence Centre, 650, Route Des Lucioles, F-06921, Sophia-Antipolis Cedex, France, vol. RAN WG4, No. Reno, USA; May 13, 2019-May 17, 2019, May 20, 2019 (May 20, 2019), XP051740931, 3 pages, Retrieved from the Internet: URL: http://www.3gpp.org/ftp/tsg%5Fran/WG4%5FRadio/TSGR4%5F91/Docs/R4%2D1906789%2Ezip [retrieved on May 20, 2019] section 2.
International Search Report and Written Opinion—PCT/US2021/026527—ISA/EPO—dated Jul. 13, 2021.
Samsung: "Summary of Email Discussion for Rel.17 Enhancements on MIMO for NR", 3GPP Draft, 3GPP TSG RAN Meeting #86, RP-192435, 3rd Generation Partnership Project (3GPP), Mobile Competence Centre, 650, Route Des Lucioles, F-06921, Sophia-Antipolis Cedex, France, vol. TSG RAN, No. Sitges, Spain, Dec. 9, 2019-Dec. 12, 2019, Dec. 3, 2019 (Dec. 3, 2019), XP051835464, 31 pages, Retrieved from the Internet: URL: https://ftp.3gpp.org/tsg_ran/TSG_RAN/TSGR_86/Docs/RP-192435.zip RP-192435 R17 FeMIMO RAN Email Discussion.docx [retrieved on Dec. 3, 2019] p. 5, Section 5, table 3 of part 5.1.].

\* cited by examiner

FREQUENCY PRE-COMPENSATION FOR HIGH-SPEED TRAIN SINGLE FREQUENCY NETWORKS

CROSS-REFERENCE TO RELATED APPLICATIONS

The present application claims priority to and the benefit of U.S. Provisional Patent Application No. 63/008,562, filed Apr. 10, 2020, and entitled "Frequency Pre-Compensation for High-Speed Train Single Frequency Networks," the disclosure of which is incorporated by reference herein in its entirety as if fully set forth below in its entirety and for all applicable purposes.

TECHNICAL FIELD

This application relates to wireless communication systems, and more particularly to methods (and associated devices and systems) for improving communication in a high-speed train single frequency network.

INTRODUCTION

Wireless communications systems are widely deployed to provide various types of communication content such as voice, video, packet data, messaging, broadcast, and so on. These systems may be capable of supporting communication with multiple users by sharing available system resources. A wireless multiple-access communications system may include a number of base stations (BSs), each simultaneously supporting communications for multiple communication devices, which may be otherwise known as user equipment (UE). BSs may have numerous transmission and reception points (TRPs, also known as remote radio heads (RRHs)) connected to them (e.g., via fiber), spaced at various points distant from the BS to expand the coverage area outside the range of the BS itself.

Some TRPs may be located along the path of a high-speed train to enable communication between the BS and UEs located on the train during transit. The TRPs may operate using a single (common) frequency when communicating with a UE, making the existence of multiple TRPs transparent to the UE. As the UE moves at high velocity along the railway, the UE may receive signals from multiple TRPs at once and perform channel state estimation and provide channel state information (CSI) reports based on reference signals from multiple TRPs.

However, problems arise when transmitting and receiving reference signals in the context of a rapidly-moving UE. As the UE moves rapidly toward a TRP, the UE may perceive reference signals originating at the TRP at a higher frequency than expected because of the Doppler effect. Similarly, as the UE moves rapidly away from a TRP, the UE may perceive reference signals originating at the TRP at a lower frequency than expected because of the Doppler effect. If the Doppler shift becomes too great, i.e., greater than the pull-in range at the UE, the UE may be unable to acquire the reference signals transmitted from the TRP. Thus, there is a need to provide techniques for mitigating the effect of a large Doppler shift in a high-speed train single frequency network to enable a UE to effectively receive reference signals from TRPs in the network.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes determining, by a base station, a frequency pre-compensation value for a transmission and reception point (TRP) on a single frequency network (SFN). The method further includes indicating, by the base station to a user equipment (UE), the frequency pre-compensation value via the TRP. The method further includes applying, by the base station, the frequency pre-compensation value to a reference signal when directing the TRP to transmit the reference signal to the UE.

In an additional aspect of the disclosure, a method of wireless communication includes receiving, by a user equipment from a TRP on an SFN, an indication of a frequency pre-compensation value for use by the TRP. The method further includes receiving, by the UE from the TRP, a reference signal modified by the frequency pre-compensation value. The method further includes narrowing, by the UE, a range of a tracking loop based on the indicated frequency pre-compensation value, and performing, by the UE, channel estimation based on the narrowed tracking loop.

In an additional aspect of the disclosure, a base station includes a processor configured to determine a frequency pre-compensation value for a TRP on an SFN. The processor is further configured to indicate to a UE the frequency pre-compensation value via the TRP, and apply the frequency pre-compensation value to a reference signal when directing the TRP to transmit the reference signal to the UE.

In an additional aspect of the disclosure, a UE includes a transceiver configured to receive from a TRP on an SFN, an indication of a frequency pre-compensation value for use by the TRP. The transceiver is further configured to receive from the TRP a reference signal modified by the frequency pre-compensation value. The UE also includes a processor configured to narrow range of a tracking loop based on the indicated frequency pre-compensation value and perform channel estimation based on the narrowed tracking loop.

In an additional aspect of the disclosure, a non-transitory computer-readable medium has program code recorded thereon. The program code includes code for causing a base station to determine a frequency pre-compensation value for a TRP on an SFN. The program code further includes code for causing the base station to indicate to a UE the frequency pre-compensation value via the TRP. The program code further includes code for causing the base station to apply the frequency pre-compensation value to a reference signal when directing the TRP to transmit the reference signal to the UE.

In an additional aspect of the disclosure, a non-transitory computer-readable medium has program code recorded thereon. The program code includes code for causing a UE to receive from a TRP on an SFN an indication of a frequency pre-compensation value for use by the TRP. The program code further includes code for causing the UE to receive from the TRP a reference signal modified by the frequency pre-compensation value. The program code further includes code for causing the UE to narrow a range of a tracking loop based on the indicated frequency pre-compensation value. The program code further includes code for causing the UE to perform channel estimation based on the narrowed tracking loop.

In an additional aspect of the disclosure, a base station includes means for determining a frequency pre-compensation value for a TRP on an SFN. The base station further includes means for indicating to a UE the frequency pre-compensation value via the TRP, and means for applying the frequency pre-compensation value to a reference signal when directing the TRP to transmit the reference signal to the UE.

In an additional aspect of the disclosure, a UE includes means for receiving from a TRP on an SFN an indication of a frequency pre-compensation value for use by the TRP. The UE further includes means for receiving from the TRP a reference signal modified by the frequency pre-compensation value. The UE further includes means for narrowing a range of a tracking loop based on the indicated frequency pre-compensation value, and means for performing channel estimation based on the narrowed tracking loop.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
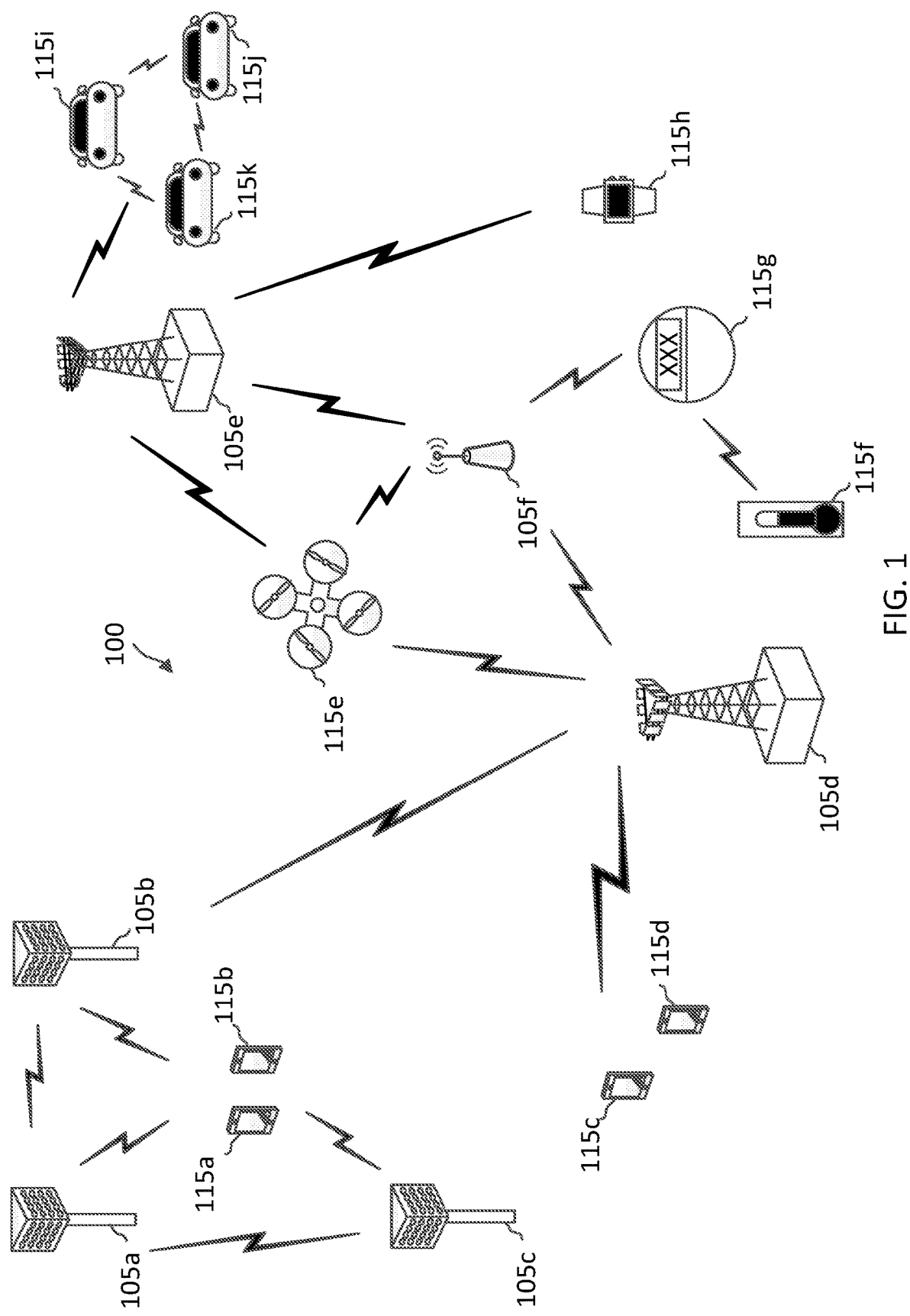
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present disclosure describes mechanisms to better communicate reference signals in a high-speed train (HST) single frequency network (SFN) so that the effective Doppler spread of the reference signals are within the pull-in range of receiving user equipment (UEs). In an HST SFN, a number of transmission and reception points (TRPs) are distributed along the path of an HST. The TRPs are connected to one or more base stations (BSs) through, for example, a fiber connection, and expand the coverage area of the BS(s). As the train moves along the track, a UE on the train may transition its connection from a TRP it is moving away from, to another TRP it is moving towards. A UE may be connected to multiple TRPs at once. For example, each TRP may use the same frequency for downlink communication to a UE so that the UE is only aware of a single TRP or BS, regardless of how many TRPs the UE is connected to.

Each TRP may transmit a reference signal, e.g., a tracking reference signal (TRS), which each TRP may have received from one or more BS(s). The TRS (which may also be a CSI-RS with TRS information) may indicate to the UE the Quasi-Colocation (QCL) type, which may indicate, for example, Doppler shift, Doppler spread, average delay, and/or delay spread. Each TRS may be associated with a Transmission Configuration Indicator (TCI) state, from which the UE may derive time, frequency, and/or spatial properties of a signal for use in demodulating data (e.g., on the physical downlink shared channel) quasi-colocated with the reference signal. For example, a given BS may control multiple TRPs along the path of the track. The BS may determine a TRS with a first TCI for a first TRP and a second TRS with a second TCI for a second TRP. The BS may derive a third TRS (e.g., from the first and second TRSs) with a third TCI state, with each TRP transmitting the third TRS on the SFN. The existence of the two distinct TRPs may remain invisible to the UE when using SFN, since both TRPs transmit the TRS on the same time/frequency resources.

A channel in an HST SFN may possess different characteristics than a channel used for communication between a BS (or TRP) and a UE which is stationary or moving slower than an HST. An HST SFN channel undergoes a higher Doppler shift and is highly direction (i.e., line-of-sight dominant), with low frequency selectivity. An HST SFN channel may also have a narrow Doppler spread (e.g., a maximum of about 13.9 kHz at 30 GHz for a UE travelling at 500 km/h). Existing TRS schemes in Frequency Range 2 (which includes millimeter wave frequencies) may have a pull-in range of about ±14 kHz. Because the effective Doppler spread in an HST SFN channel may be too large in relation to the pull-in range possible at the UE, existing TRS schemes may not allow a UE to acquire TRSs from TRPs in the HST SFN without prohibitive search overhead at the UE. According the aspects of the present disclosure, however, a BS may apply frequency pre-compensation to the transmission of the TRSs on a per-beam or per-panel basis (or also, possibly, on a per-TRP basis) to allow effective use of existing TRS structures in an HST SFN.

In some embodiments, a BS may determine a first frequency pre-compensation value for a first TRP in an HST SFN to apply when transmitting the TRS to a UE. The BS may also determine a second frequency pre-compensation value for a second TRP to apply when transmitting the TRS to the UE. The first and second pre-compensation values may be the same, or may be different from each other. For example, if the UE is travelling away from the first TRP and toward the second TRP, the pre-compensation value for the first TRP may be positive (i.e., the first TRP would increase the frequency at which the TRS is transmitted), and the pre-compensation value for the second TRP may be negative (i.e., the second TRP would decrease the frequency at which the TRS is transmitted). Each TRP may apply its respective pre-compensation value on a per-beam or per-panel basis (or, alternatively, per-TRP basis). For example, different beams originating at a TRP may employ different pre-compensation values, and beams originating from different panels on the same TRP may employ different pre-compensation values. The pre-compensation values may be arbitrary under the current operating conditions, or selected from a set of candidate values.

In some embodiments, the BS may indicate the first and/or second pre-compensation value to the UE, for example, in a downlink control information (DCI) message or a radio resource control (RRC) signal through the first and/or second TRPs. The indication may be in the form of an index into a look-up table pre-configured on the UE. The UE may use the pre-compensation value(s) to inform its search for the TRS. For example, the UE may narrow the range of the tracking loop used to acquire the TRS based on the pre-compensation value(s). The UE may then acquire the TRS and perform channel estimation based on the narrowed tracking loop range.

In some embodiments, the pre-compensation value(s) may be based on the current properties of the SFN (e.g., on properties of the UE or the TRPs) and/or updated based on changes to the SFN. For example, the pre-compensation value(s) may be based on the position and velocity of the UE, which may be reported by the UE (e.g., based on GPS) or determined by the BS. The pre-compensation values may also be based on, for example, the beams and/or panels used by the first and/or second TRPs to transmit the TRS. The pre-compensation value(s) may be updated any time the SFN undergoes a change, and the new values may be applied to the TRS by the respective TRPs and indicated to the UE.

In some embodiments, the BS may additionally or alternatively determine frequency pre-compensation values and apply them to other types of signals (e.g., synchronization signals, signals carrying system information, and/or synchronization signal blocks) as described herein with respect to reference signals. For example, primary synchronization and/or secondary synchronization signals may also be frequency pre-compensated on a per-beam, per-panel, or per-TRP basis to enable meaningful reception by the UE (as discussed with respect to the other embodiments herein). Moreover, the coarse-level pre-adjustment may be conveyed as system information.

Aspects of the present application provide several benefits. For example, embodiments of the present disclosure allow a UE to better acquire a TRS in an HST SFN by reducing the effective Doppler spread of the TRS. Narrowing the effective Doppler spread of the TRS (hence narrowing the UE's tracking loop) also reduces the search and processing overhead involved in locating the TRS.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like, as well as in some embodiments with any type of other UE 115. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs, or sidelink transmissions between UEs (or via UEs serving as relays to BSs).

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V) communication. The network 100 may also further provide additional network efficiency through other device-to-device communication such as via PC5 links or other sidelinks, including according to embodiments of the present disclosure.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH). The BS 105 may determine and apply beam-specific and/or panel-specific frequency pre-compensation to the SSB (e.g., to the signals in the SSB) when transmitting the SSB through a TRP as described in detail herein with respect to reference signals according to embodiments of the present disclosure.

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 may perform a random access procedure to establish a connection with the BS 105. In a four-step random access procedure, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response may be referred to as a message 1 (MSG 1), a message 2 (MSG 2), a message 3 (MSG 3), and a message 4 (MSG 4), respectively. In other examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (msgA). The combined random access response and connection response in the two-step random access procedure may be referred to as a message B (msgB).

After establishing a connection, the UE 115 and the BS 105 can enter an operational state, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. Further, the UE 115 may transmit a UL communication signal to the BS 105 according to a configured grant scheme.

A configured grant transmission is an unscheduled transmission, performed on the channel without a UL grant. A configured grant UL transmission may also be referred to as a grantless, grant-free, or autonomous transmission. In some examples, the UE 115 may transmit a UL resource via a configured grant. Additionally, configured-UL data may also be referred to as grantless UL data, grant-free UL data, unscheduled UL data, or autonomous UL (AUL) data. Additionally, a configured grant may also be referred to as a grant-free grant, unscheduled grant, or autonomous grant. The resources and other parameters used by the UE for a configured grant transmission may be provided by the BS in one or more of a RRC configuration or an activation DCI, without an explicit grant for each UE transmission. Moreover, the UE may utilize a configured grant transmission in one or more sidelink communications with one or more other UEs (either for D2D communication or the other UE operating as an L2 or L3 relay to a BS).

Figure 2:
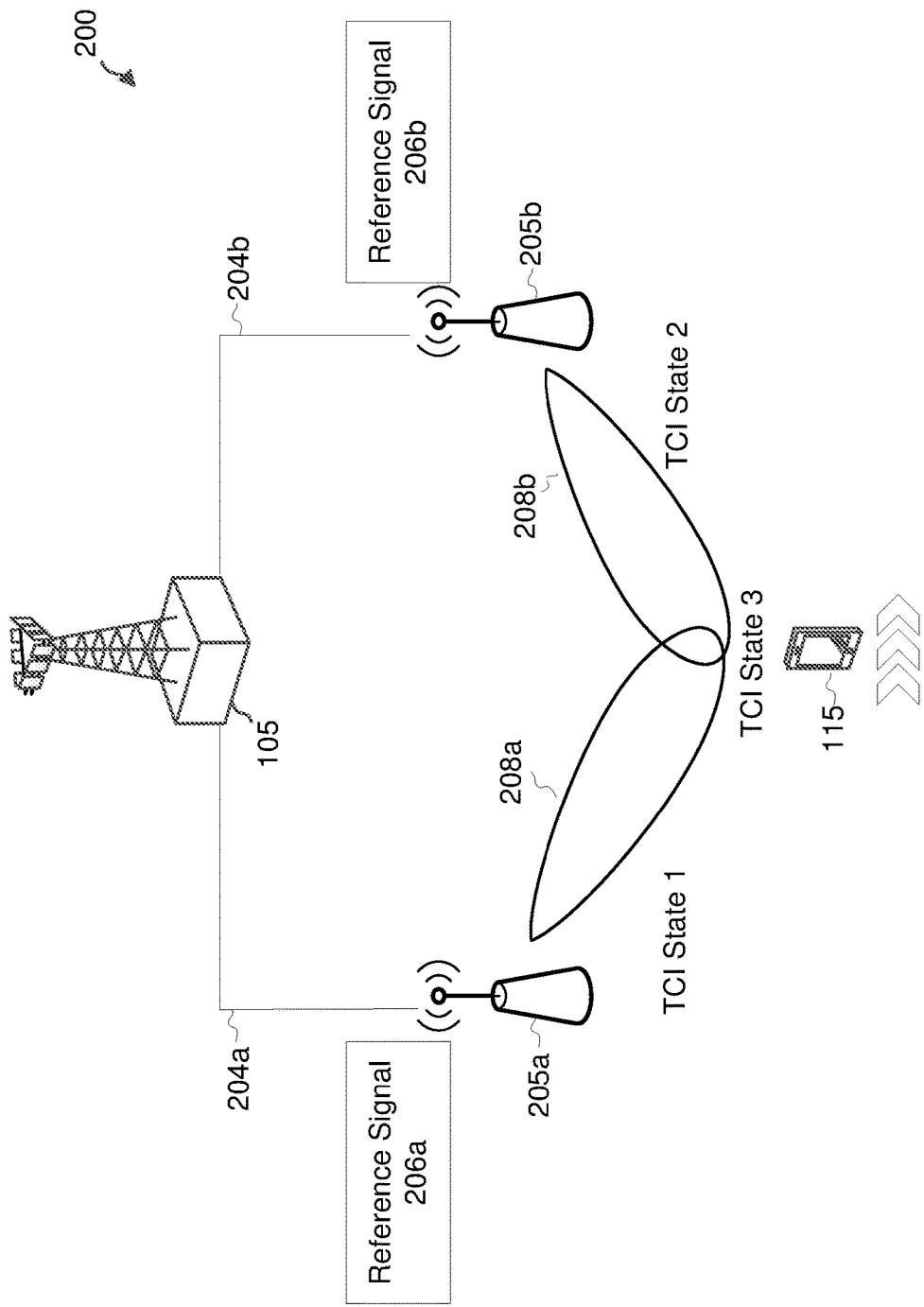
FIG. 2 illustrates a high-speed train single frequency network according to embodiments of the present disclosure.

The coverage range of a BS 105 can be extended by connecting one or more TRPs 205 (as illustrated in FIG. 2) via, for example, a fiber connection. A TRP 205 may itself be a BS 105. Alternatively, a TRP 205 may include transmit functionality under the control of a remote BS 105, e.g. the TRP 205 may be an example of a remote radio head (RRH). A BS 105 may communicate through one or more TRPs 205 with a UE 115. The BS 105 may transmit data intended for the UE 115 to the TRP 205, which in turn may transit the data to the UE 115. Similarly, the UE 115 may transmit a signal intended for a BS 105 to a TRP 205, which may then transmit the signal to the BS 105.

FIG. 2 illustrates aspects of an HST SFN 200 according to embodiments of the present disclosure. For simplicity, a single BS 105 (or baseband unit), two TRPs 205, and one UE 115 are illustrated, but any fewer or more than two TRPs 205 and more than one UE 115 are possible according to aspects of the present disclosure. BS 105 may rely upon one or more of the TRPs 205 to communicate with the UE 115. In other examples, one or more of TRPs 205 may be examples of BSs 105 in FIG. 1 (under control of one or more BBUs).

A UE 115 traveling on a high-speed train (or at high speed generally) may quickly move out of the coverage range of a single BS 105. To provide connectivity to UE 115, a number of TRPs 205 may be connected via links 204 (e.g., fiber) to the BS 105 and placed at various points along the path of a railway. For example, TRP 205a is illustrated as connected to BS 105 via link 204a and TRP 205b is connected to BS 105 via link 204b. As the UE 115 moves along the railway it may transition between one or more TRPs 205. As illustrated, UE 115 may be in range of and communicating with TRPs 205a and 205b. Each TRP 205 may transmit a reference signal (e.g., a TRS) to UE 115. According to embodiments of the present disclosure, TRP 205a may transmit TRS 206a using a beam 208a and TRP 205b may transmit TRS 206b using a beam 208b. While TRS 206a and TRS 206b may be transmitted using distinct TCI states 1 and 2, according to embodiments of the present disclosure, BS 105 may derive a single TRS appropriate for transmission from both TRSs 205 using TCI state 3 with joint QCL data so that UE 115 is unaware it is receiving the TRSs 206 (i.e., the same TRS) from two different TRPs 205. As UE 115 moves away from TRP 205a and toward TRP 205b, the doppler effect may cause UE 115 to perceive TRS 206a as being transmitted on a lower frequency than it is actually transmitted on, and TRS 206b as being transmitted at a higher frequency than it is actually transmitted on. This may cause enough frequency shift that it falls outside the pull-in range of the UE 115's tracking loop.

Figure 3:
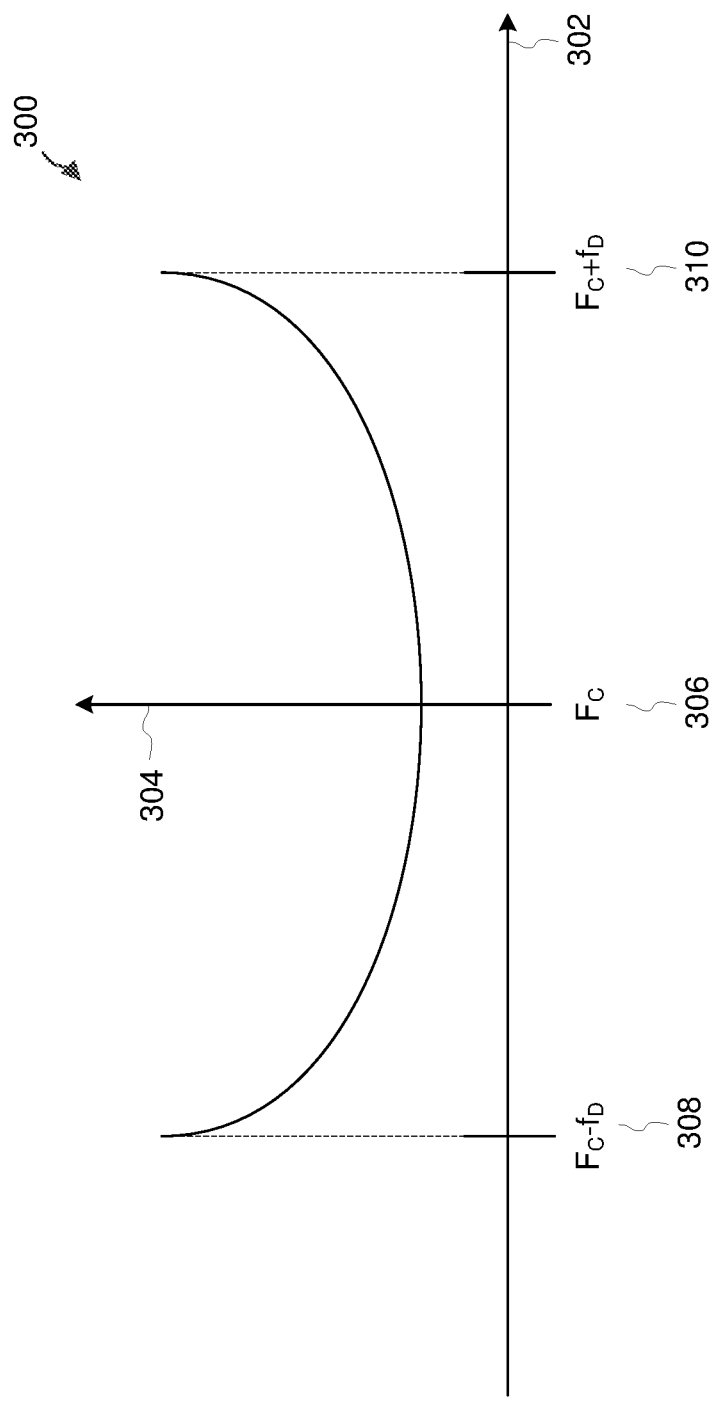
FIG. 3 illustrates a Doppler power spectral density according to embodiments of the present disclosure.
Figure 4:
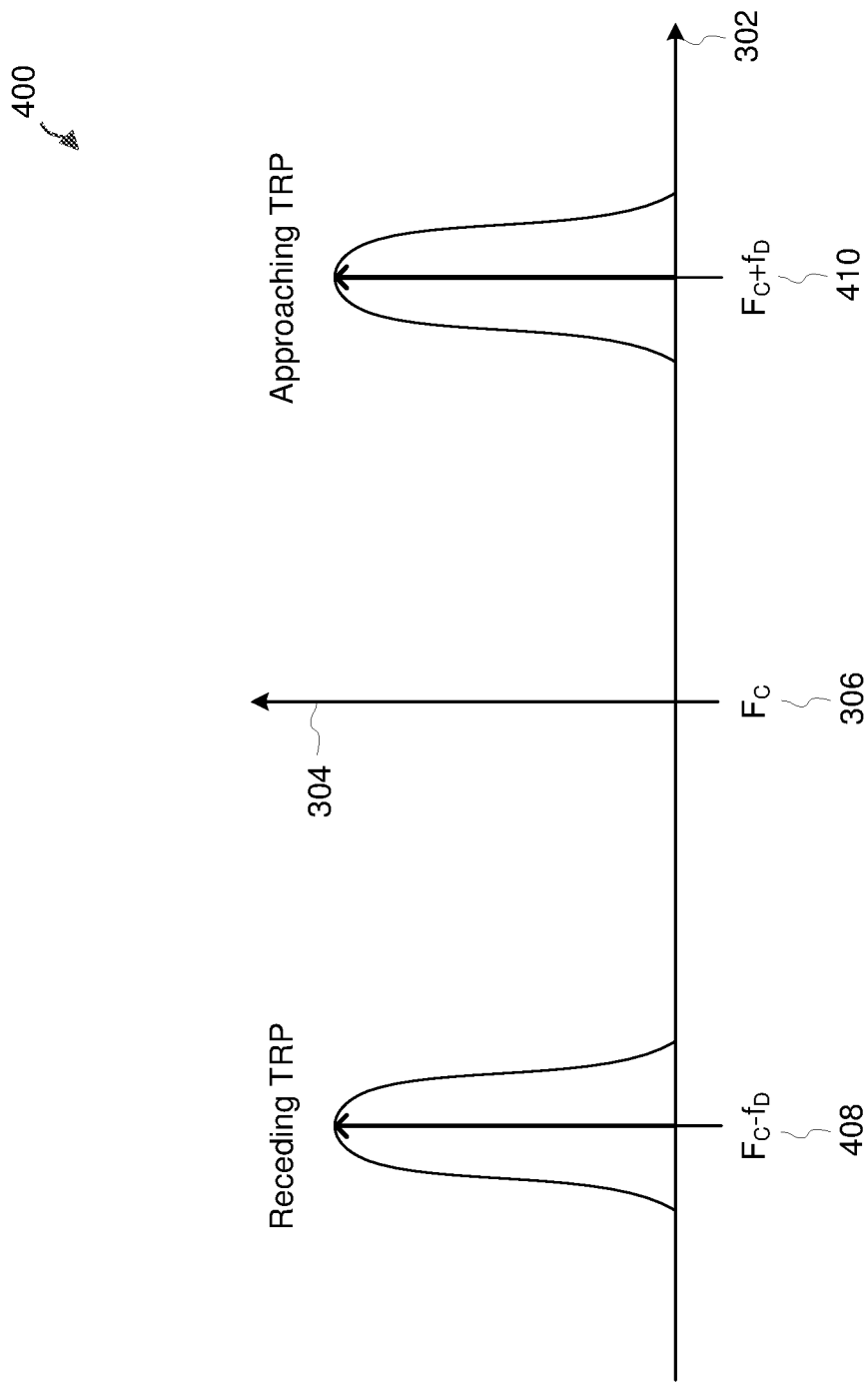
FIG. 4 illustrates a Doppler power spectral density according to embodiments of the present disclosure.

For example, turning now to FIGS. 3 and 4, FIG. 3 illustrates a Doppler power spectral density (PSD) model 300 for a signal (e.g., a TRS) transmitted from a single source (e.g., from a single TRP 205, originating at a BS 105, or from multiple TRPs 205 in an SFN) and received by a UE 115 according to aspects of the present disclosure. The X-axis 302 represents the frequency shift from the carrier, and the Y-axis 304 represents the Doppler PSD. $F_c$ represents the central (expected) frequency, and $F_d$ represents the maximum Doppler shift. Point 306 is the PSD at the central frequency ($F_c$), while point 308 illustrates the PSD when the frequency is shifted downward by $F_d$, and point 310 illustrates the PSD when the frequency is shifted upward by $F_d$. The Doppler PSD model 300 is based on Clarke's model, which assumes rich scattering around the UE's antenna upon reception. This may be applicable in scenarios where the UE 115 is receiving signals in one or more sub-6 GHz bands, and therefore lower Doppler shift (e.g., due to the lower carrier frequency) with corresponding better pull-in range for the UE 115's tracking loop.

By contrast, FIG. 4 illustrates the Doppler PSD in an HST SFN for a signal (e.g., a TRS) transmitted by two TRPs 205

(and originating at a BS 105) and received by a UE 115 where there is a larger Doppler shift (e.g., due to higher velocity and/or higher carrier frequency e.g. in the mmW bands). Due to the high directionality of the beams (line-of-sight dominant) and low frequency selectivity, the Doppler spread is narrower. Instead, it is Doppler shift dominant. As a result of these characteristics, as illustrated there are effectively two copies of the PSD curve, one centered at point 408 corresponding to the receding TRP 205 (the TRP the UE is moving away from), and one centered at point 410 corresponding to the TRP 205 the UE is moving toward. Due to the high frequency and high speed, the Doppler spread is greater than what is seen in FIG. 3. The larger Doppler spread in the HST SFN scenario of FIG. 4 makes it difficult for the UE 115 to receive the TRS using existing TRS structures, without incurring significant search and processing overhead, and possibly renders the UE 115 unable to recover the TRS if the Doppler shift pushes the copies outside the pull-in range of the UE 115's tracking loop. According to embodiments of the present disclosure, the TRP(s) 205 may apply one or more frequency pre-compensation values before transmitting the TRSs so that they are within the pull-in range of the UE 115.

Figure 5:
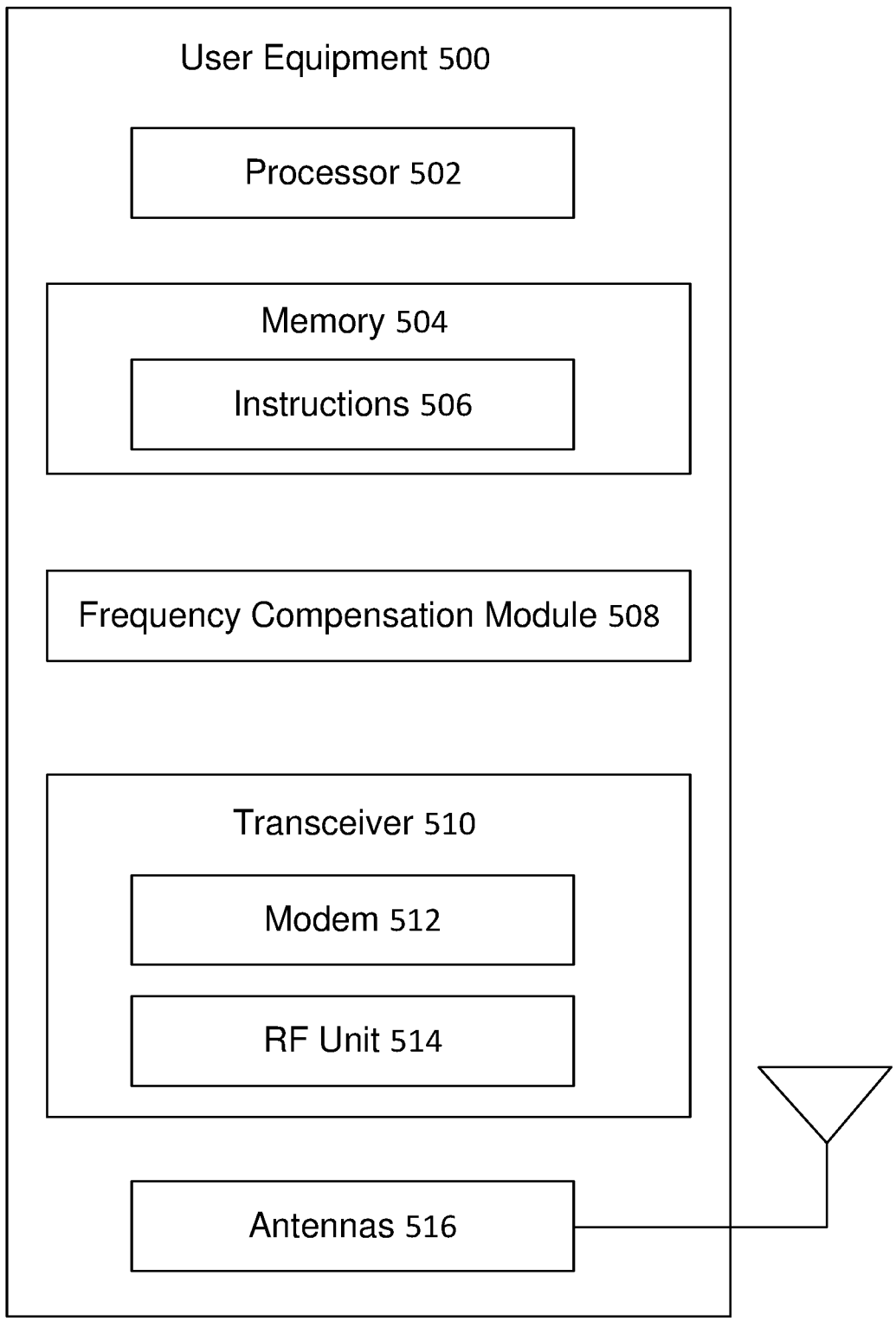
FIG. 5 is a block diagram of an exemplary UE according to embodiments of the present disclosure.

FIG. 5 is a block diagram of an exemplary UE 500 according to embodiments of the present disclosure. The UE 500 may be a UE 115 as discussed above in FIGS. 1-4. As shown, the UE 500 may include a processor 502, a memory 504, a frequency compensation module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with embodiments of the present disclosure, for example, aspects of FIGS. 1-4 and 7-8. Instructions 506 may also be referred to as program code. The program code may be for causing a wireless communication device (or specific component(s) of the wireless communication device) to perform these operations, for example by causing one or more processors (such as processor 502) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The frequency compensation module 508 may be implemented via hardware, software, or combinations thereof. For example, frequency compensation module 508 may be implemented as a processor, circuit, and/or instructions 506 stored in the memory 504 and executed by the processor 502. In some examples, the frequency compensation module 508 can be integrated within the modem subsystem 512. For example, the frequency compensation module 508 can be implemented by a combination of software components (e.g., executed by a DSP or a general processor) and hardware components (e.g., logic gates and circuitry) within the modem subsystem 512.

The frequency compensation module 508 may be used for various aspects of the present disclosure, for example, aspects of FIGS. 1-4 and 7-8. The frequency compensation module 508 is configured to communicate with other components of the UE 500 to recover a TRS originating at a BS 105 and transmitted by one or more TRPs 205 in an HST SFN. The TRS may have a frequency pre-compensation value applied by one or more of the TRPs 205. For example, considering only two TRPs 205 (though any number of TRPs 205 are possible), the first TRP 205 may apply a first pre-compensation value to the TRS, and the second TRP 205 may apply a second pre-compensation value to the TRS (each before transmission). The pre-compensation values may be the same, or different from each other. For example, if the UE 500 is travelling away from the first TRP 205 and toward the second TRP 205, the frequency compensation module 508 may recover the TRS from the first TRP 205 after the first TRP 205 applied a positive pre-compensation value (i.e., at an increased frequency), and it may recover the TRS from the second TRP 205 after the second TRP 205 applied a negative pre-compensation value (i.e., at a decreased frequency). The TRS may also or alternatively be transmitted on different beams or from different panels on the TRPs 205, with the TRS originating at each beam or panel having a different frequency pre-compensation value applied.

According to embodiments of the present disclosure, the frequency compensation module 508 may be able to recover the TRS because the pre-compensation values shift the TRSs to a range around the carrier frequency that is within the tracking loop capability of the UE 500. In some examples, the frequency compensation module 508 may have further stored the one or more pre-compensation values that the TRPs 205 will apply (e.g., received at a prior time via RRC and/or DCI signaling). In such examples, the frequency compensation module 508 may use as the initial value for the frequency tracking loop the compensated frequency per the corresponding beam/pane/TRP. The frequency compensation module 508 may, in some examples, use an index signaled from the TRP(s) 205 that identifies what entry to access within a look-up table that stores a plurality of pre-compensation values for the UE 500 to apply over time.

According to embodiments of the present disclosure, the BS may additionally or alternatively determine frequency pre-compensation values and apply them to other types of signals (e.g., to synchronization signals and signals carrying system information, or to SSBs) as described herein within to reference signals. For example, primary synchronization and/or secondary synchronization signals may also be frequency pre-compensated on a per-beam, per-panel, or per-TRP 205 basis to enable meaningful reception by the UE 500 (as discussed with respect to the other embodiments herein). Moreover, the coarse-level pre-adjustment may be conveyed as system information. The frequency compensation module 508 would process such signals and information in similar manner as described above with respect to the reference signal examples.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504, and/or the frequency compensation module 508 according to a modulation and coding scheme (MCS) (e.g., a low-density parity check (LDPC) coding scheme, a turbo coding scheme, a convolutional coding scheme, a digital beamforming scheme, etc.). The RF unit 514 may be configured to process (e.g., perform analog to digital conversion or digital to analog conversion, etc.) modulated/encoded data (e.g., UL data bursts, RRC messages, configured grant transmissions, ACK/NACKs for DL data bursts) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 500 to enable the UE 500 to communicate with other devices.

The RF unit 514 may provide the modulated and/or processed data (e.g., data packets or, more generally, data messages that may contain one or more data packets and other information) to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., system information message(s), RACH message(s) (e.g., DL/UL scheduling grants, DL data bursts, RRC messages, ACK/NACK requests, reference signals such as TRSs, etc.) to the frequency compensation module 508 for processing. The antennas 516 may include multiple antennas of similar or different designs in order to sustain multiple transmission links. The RF unit 514 may configure the antennas 516.

In an embodiment, the UE 500 can include multiple transceivers 510 implementing different RATs (e.g., NR and LTE). In an embodiment, the UE 500 can include a single transceiver 510 implementing multiple RATs (e.g., NR and LTE). In an embodiment, the transceiver 510 can include various components, where different combinations of components can implement different RATs.

Figure 6:
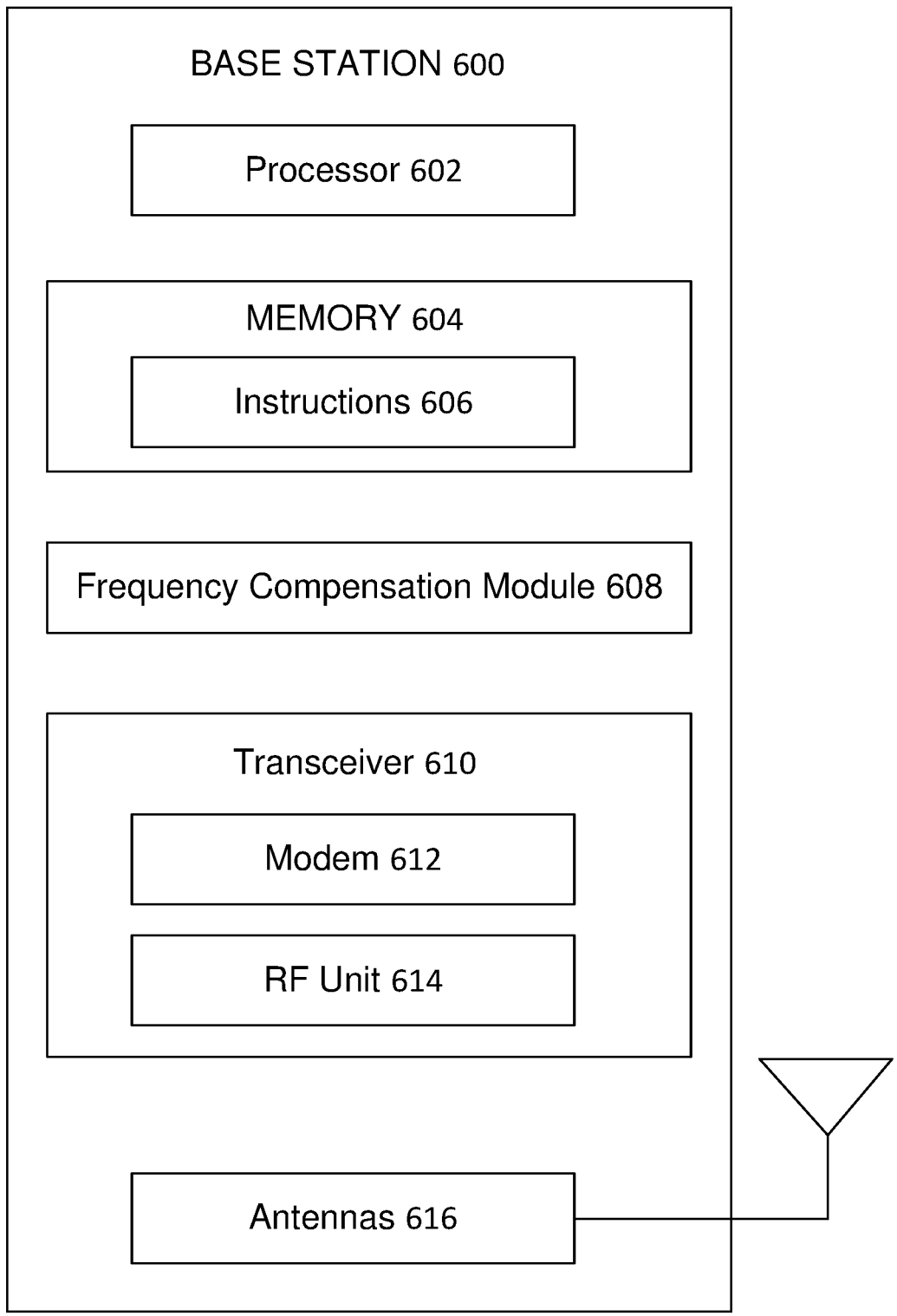
FIG. 6 is a block diagram of an exemplary BS according to embodiments of the present disclosure.

FIG. 6 is a block diagram of an exemplary BS 600 according to embodiments of the present disclosure. The BS 600 may be a BS 105 as discussed above in FIGS. 1-4. As shown, the BS 600 may include a processor 602, a memory 604, a frequency compensation module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-4 and 7-8. Instructions 606 may also be referred to as code, which may be interpreted broadly to include any type of computer-readable statement(s) as discussed above with respect to FIG. 5.

The frequency compensation module 608 may be implemented via hardware, software, or combinations thereof. For example, the frequency compensation module 608 may be implemented as a processor, circuit, and/or instructions 606 stored in the memory 604 and executed by the processor 602. In some examples, the frequency compensation module 608 can be integrated within the modem subsystem 612. For example, the frequency compensation module 608 can be implemented by a combination of software components (e.g., executed by a DSP or a general processor) and hardware components (e.g., logic gates and circuitry) within the modem subsystem 612.

The frequency compensation module 608 may be used for various aspects of the present disclosure, for example, aspects of FIGS. 1-4 and 7-8. The frequency compensation module 608 may be configured to communicate with other components of the BS 600 to help determine a TRS for transmission to a UE 115 from one or more TRPs 205, and to help determine a frequency pre-compensation value for the TRPs 205 to apply when transmitting the TRS to the UE 115. For example, the frequency compensation module 608 may be configured to determine a first frequency pre-compensation value for a first TRP in an HST SFN to apply to a TRS when transmitting the TRS to a UE. The frequency compensation module 608 may also be configured to determine a second frequency pre-compensation value for a second TRP to apply to the TRS when transmitting the TRS to the UE. The first and second pre-compensation values may be the same, or may be different from each other. For example, if the UE is travelling away from the first TRP 205 and toward the second TRP 205, the pre-compensation value for the first TRP 205 may be positive (i.e., the first TRP 205 would increase the frequency at which the TRS is transmitted), and the pre-compensation value for the second TRP 205 may be negative (i.e., the second TRP 205 would decrease the frequency at which the TRS is transmitted). Each TRP 205 may apply its respective pre-compensation value as determined by the frequency compensation module 608 on a per-beam or per-panel basis (or, alternatively, on a per-TRP basis). For example, different beams originating at a TRP 205 may employ different pre-compensation values (e.g., even if from the same panel), and beams originating from different panels on the same TRP 205 may employ different pre-compensation values (i.e., multiple beams from the same panel apply the same pre-compensation value, but different from beams from other panels).

The frequency compensation module 608 may select pre-compensation values arbitrarily or select the pre-compensation values from a set of candidate values. In another example, the frequency compensation module 608 may be configured to determine the pre-compensation value(s) based on the current properties of the SFN (e.g., on properties of the UE 115 or the TRPs 205) and/or update the pre-compensation value(s) based on changes to the SFN. For example, the pre-compensation value(s) may be based on the position and velocity of the UE 115, which may be reported by the UE 115 (e.g., based on GPS) or determined (or estimated) by the BS 600. Or, the BS 600 may be in communication with an HST itself in the SFN to obtain current or future velocity information (and/or related position information). The frequency compensation module 608 may also determine the pre-compensation values based on, for example, the beam directions used by the first and/or second TRPs to transmit the TRS. The frequency compensation module 608 may update the pre-compensation value(s) any time the SFN undergoes a change, and the new values may be applied to the TRS by the respective TRPs 205.

In some embodiments, the frequency compensation module 608 may be configured to indicate the first and/or second pre-compensation value to the UE 115 (e.g., in a downlink control information (DCI) or radio resource control (RRC) message) through the first and/or second TRPs 205. The indication may be in the form of an index into a look-up table pre-configured on the UE 115, for example. Further, in embodiments where the frequency compensation module 608 updates one or more of the pre-compensation values (e.g., based on a change in the SFN, detected or predicted/estimated), the frequency compensation module 608 may cause the values to be indicated to the UE 115 (e.g., in a DCI message or an RRC message if for a longer time horizon, either with the value itself being signaled or an index or other identifier that the UE 115 may use to locate the value).

In some embodiments, the UE may additionally or alternatively receive other types of signals (e.g., synchronization signals and signals carrying system information, and/or SSBs) with frequency pre-compensation applied as described herein with respect to reference signals. The UE may also receive indications of the frequency pre-compensation applied to the other types of signals. For example, primary synchronization and/or secondary synchronization signals may also be frequency pre-compensated on a per-beam, per-panel, or per-TRP 205 basis to enable meaningful reception by the UE 500 (as discussed with respect to the other embodiments herein). Moreover, the coarse-level pre-adjustment may be conveyed as system information. The frequency compensation module 608 would perform similar operations to achieve this in similar manner as described above with respect to the reference signal examples. As shown, the transceiver 610 may include the modem subsystem 612 and the RF unit 614. The transceiver 610 can be configured to communicate bi-directionally with other devices, such as the UEs 115 and/or 300 and/or another core network element. The modem subsystem 612 may be configured to modulate and/or encode data according to a MCS (e.g., a LDPC coding scheme, a turbo coding scheme, a convolutional coding scheme, a digital beamforming scheme, etc.). The RF unit 614 may be configured to process (e.g., perform analog to digital conversion or digital to analog conversion, etc.) modulated/encoded data (e.g., RRC messages, TRSs, etc.) from the modem subsystem 612 (on outbound transmissions) or of transmissions originating from another source, such as a UE 115 or 300. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 600 to enable the BS 600 to communicate with other devices.

The RF unit 614 may provide the modulated and/or processed data, (e.g., data packets or, more generally, data messages that may contain one or more data packets and other information) to the antennas 616 for transmission to one or more other devices. The antennas 616 may further receive data messages transmitted from other devices and provide the received data messages for processing and/or demodulation at the transceiver 610. The transceiver 610 may provide the demodulated and decoded data (e.g., RRC messages, UL data, information about a UE 500's position and velocity, etc.) to the frequency compensation module 608 for processing. The antennas 616 may include multiple antennas of similar or different designs in order to sustain multiple transmission links.

In an embodiment, the BS 600 can include multiple transceivers 610 implementing different RATs (e.g., NR and LTE). In an embodiment, the BS 600 can include a single transceiver 610 implementing multiple RATs (e.g., NR and LTE). In an embodiment, the transceiver 610 can include various components, where different combinations of components can implement different RATs.

Figure 7:
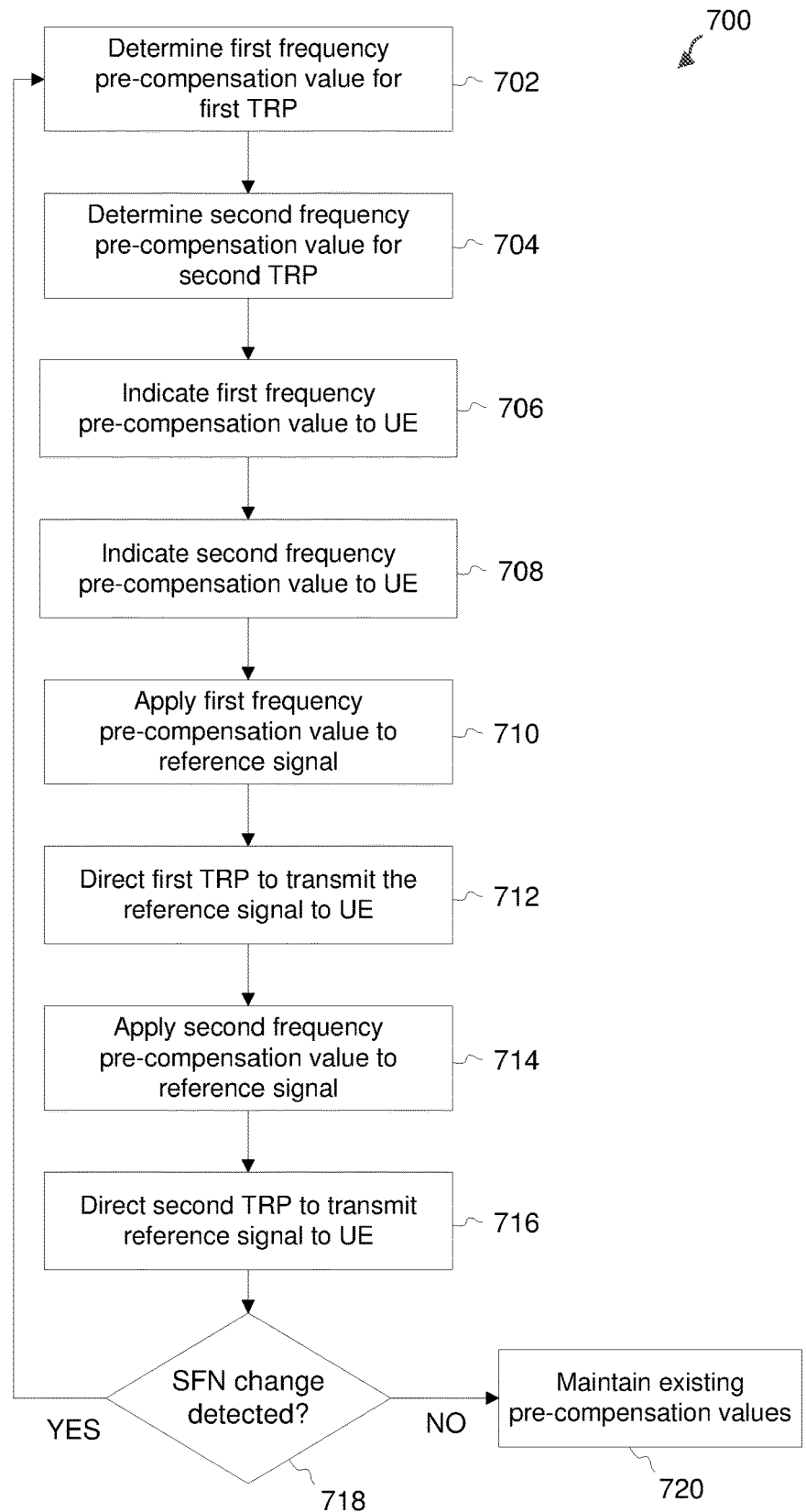
FIG. 7 illustrates a flow diagram of a wireless communication method according to embodiments of the present disclosure.

FIG. 7 illustrates a flow diagram of a wireless communication method 700 according to some embodiments of the present disclosure. Aspects of the method 700 can be executed by a wireless communication device, such as a BS 105/600, utilizing one or more components, such as the processor 602, the memory 604, the frequency compensation module 608, the transceiver 610, the modem 612, the one or more antennas 616, and various combinations thereof. The BS 105 may be communicating with a UE 115 on an HST travelling within the range of two or more TRPs 205 on an SFN. For simplicity, the method is illustrated with reference to two TRPs 205, though a greater number of TRPs 205 may be possible. As illustrated, the method 700 includes a number of enumerated steps, but embodiments of the method 700 may include additional steps before, during, after, and in between the enumerated steps. Further, in some embodiments, one or more of the enumerated steps may be omitted or performed in a different order.

At block 702, the BS 105 determines a first frequency pre-compensation value to apply to a reference signal (e.g., a TRS or a CSI-RS with TRS information) to be transmitted by a first TRP 205 to a UE 115. The first frequency pre-compensation value may be based on properties (and/or estimates of those properties) of the SFN, for example, the current position and/or velocity of the UE 115, or the beam(s) and/or panel(s) to be used by the first TRP 205 to transmit the TRS. The first frequency pre-compensation value may be positive (e.g., if the UE 115 is moving away from the first TRP) or negative (e.g., if the UE 115 is moving toward the first TRP). The first frequency pre-compensation value may be chosen arbitrarily, selected from a set (e.g., a predefined set) of candidate values, or from a calculation or derivation.

At block 704, the BS 105 determines a second frequency pre-compensation value to apply to the reference signal to be transmitted by a second TRP 205 to the UE 115. The second frequency pre-compensation value may be based on properties (and/or estimates of those properties) of the SFN, for example, the current position and/or velocity of the UE 115, or the beam(s) and/or panel(s) to be used by the second TRP 205 to transmit the second TRS. The first frequency pre-compensation value may be positive (e.g., if the UE 115 is moving away from the second TRP) or negative (e.g., if the UE 115 is moving toward the second TRP), and may be the same or different than the first frequency pre-compensation value. The second frequency pre-compensation value may be chosen arbitrarily, selected from a set of candidate values, or from a calculation or derivation.

At block 706, the BS 105 transmits (e.g., in a DCI or RRC message) an indication of the first frequency pre-compensation value to the UE 115 (e.g., via the first TRP 205). The value may be a raw value, or an index into look-up table configured at the UE 115.

At block 708, the BS 105 transmits (e.g., in a DCI or RRC message) an indication of the second frequency pre-compensation value to the UE 115 (e.g., via the second TRP 205). The value may be a raw value, or an index into look-up table configured at the UE 115. Further, the first and second pre-compensation values may be transmitted via the TRPs 205 at approximately the same time as each other, as part of the same message, or one after the other. Further, in some embodiments the first and second pre-compensation values may be transmitted via respective TRPs 205, while in other embodiments the values may be transmitted from one of the multiple TRPs 205.

At block 710, the BS 105 applies the first frequency pre-compensation value to the reference signal (or directs the first TRP 205 to apply the value). The first frequency pre-compensation value may increase or decrease the frequency of the reference signal depending, respectively, on whether the UE 115 is moving away from or toward the first TRP 205.

At block 712, the BS 105 directs the first TRP 205 to transmit the reference signal (with the first frequency pre-compensation value applied) to the UE 115.

At block 714, the BS 105 applies the second frequency pre-compensation value to the reference signal (or directs the second TRP 205 to apply the value). The second frequency pre-compensation value may increase or decrease the frequency of the reference signal depending, respectively, on whether the UE 115 is moving away from or toward the second TRP 205. The BS 105 may apply the first frequency pre-compensation value to the first reference and the second frequency pre-compensation value to the second reference signal at or near the same time as each other, or sequentially.

At block 716, the BS 105 directs the second TRP 205 to transmit the reference signal (with the second frequency pre-compensation value applied) to the UE 115. Further, the BS 105 may direct the first and second TRPs 205 to transmit their respective (pre-compensated) reference signals to the UE at approximately the same time.

At decision block 718, the BS 105 determines whether any characteristics of the SFN have changed. For example, the UE 115 may be in a different position, travelling in a different direction, or travelling at a different speed (either actually measured, reported, or estimated). Alternatively, one of the TRPs 205 may have adjusted the beam(s) and/or panel(s) used to transmit their respective TRSs to the UE 115. If no change to the SFN is detected, the method proceeds to block 720, where the BS 105 maintains the existing pre-compensation values. Alternately, if a change in the SFN is detected, the method returns to block 702, and the BS 105 repeats at least some aspects of the method 700. For example, the BS 105 may repeat the entire method 700, or it may only perform parts of the method 700 related to one of the two TRPs 205.

According to embodiments of the present disclosure, the BS 105 may additionally or alternatively perform aspects of the method 700 in relation to other types of signals. For example, the BS 105 may determine frequency pre-compensation values and apply them to synchronization signals and signals carrying system information, or to SSBs. For example, primary synchronization and/or secondary synchronization signals may also be frequency pre-compensated on a per-beam, per-panel, or per-TRP basis to enable meaningful reception (as discussed with respect to the other embodiments herein). Moreover, the coarse-level pre-adjustment may be conveyed as system information.

Figure 8:
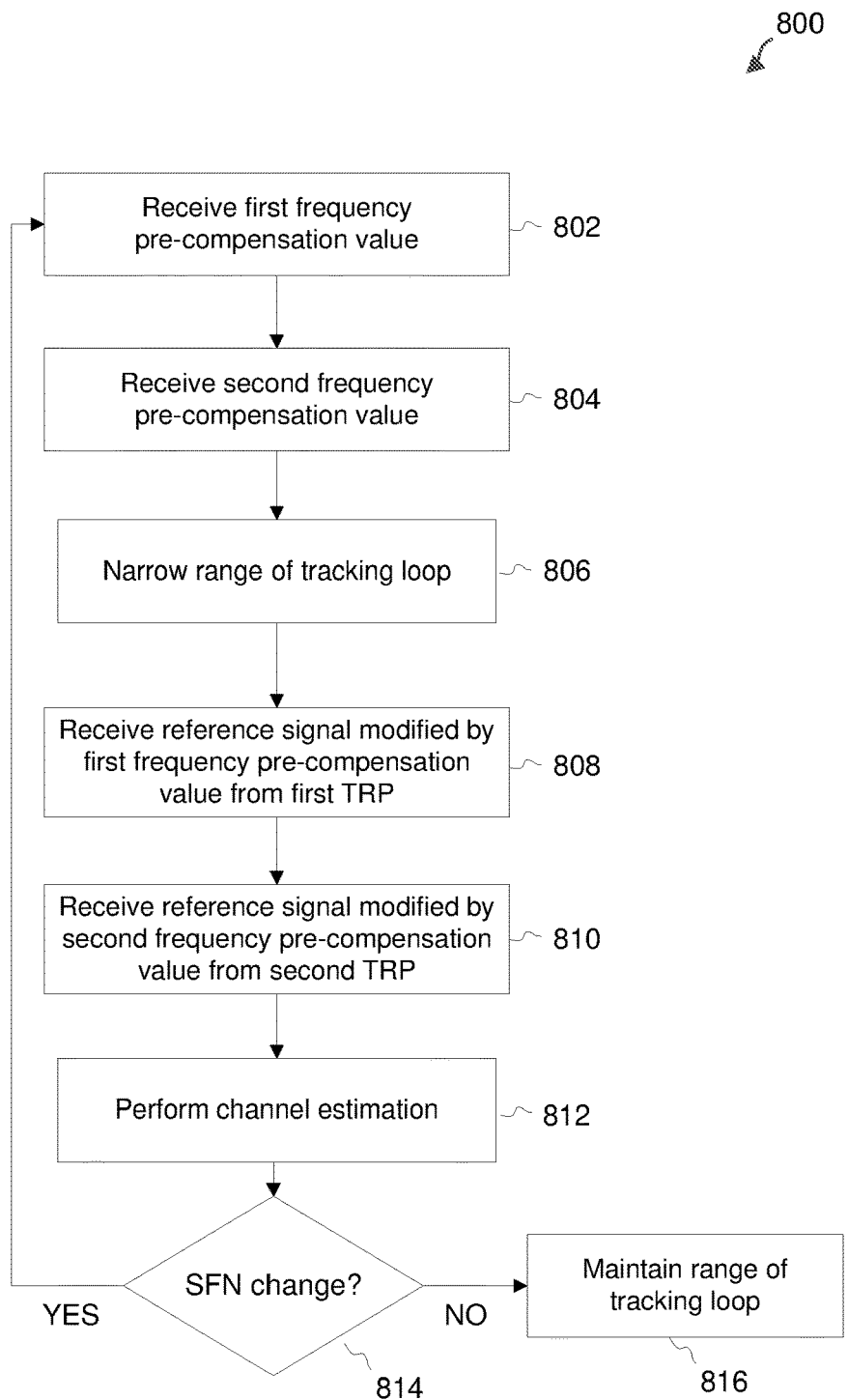
FIG. 8 illustrates a flow diagram of a wireless communication method according to embodiments of the present disclosure.

FIG. 8 illustrates a flow diagram of a wireless communication method 800 according to some embodiments of the present disclosure. Aspects of the method 800 can be executed by a wireless communication device, such as a UE 115/500, utilizing one or more components, such as the processor 502, the memory 504, the frequency compensation module 508, the transceiver 510, the modem 512, the one or more antennas 516, and various combinations thereof. The UE 115 may be on an HST travelling within the range of two or more TRPs 205 on an SFN. For simplicity, the method is illustrated with reference to two TRPs 205, though a greater number of TRPs 205 may be possible. As illustrated, the method 800 includes a number of enumerated steps, but embodiments of the method 800 may include additional steps before, during, after, and in between the enumerated steps. Further, in some embodiments, one or more of the enumerated steps may be omitted or performed in a different order.

At block 802, a UE 115 receives an indication of a first frequency pre-compensation value from a TRP 205 (e.g., a first TRP 205), originating at a BS 105. The first frequency pre-compensation value may be an arbitrary value, or in index into a lookup table of frequency pre-compensation values configured on the UE 115, and/or from a calculation or derivation.

At block 804, the UE 115 receives an indication of a second frequency pre-compensation value originating from a TRP 205 (e.g., a second TRP 205), originating at a BS 105. The indication of the second frequency pre-compensation value may be received from the same TRP 205 as the first frequency pre-compensation value (e.g., as sequential messages or as part of a common message) or from a different TRP 205. The second frequency pre-compensation value may be an arbitrary value, or in index into a lookup table of frequency pre-compensation values configured on the UE 115, and/or from a calculation or derivation. Thus, the first and second frequency pre-compensation values may be transmitted at the same time as each other or at different times, for use in configuring at least a frequency tracking loop aspect of the UE 115.

At block 806, the UE 115 narrows the range of the tracking loop used to acquire the TRS based on the first pre-compensation value and the second pre-compensation value (received at blocks 802 and 804 as discussed above). For example, the 115 UE may adjust the frequency range it uses to search for the TRS from the first TRP 205 and the second TRP 205 (as the TRS is received as part of the SFN, and thus the UE 115 does not know which TRP 205 sent the TRS).

At block 808, the UE 115 receives a reference signal (e.g., a TRS) modified by the first frequency pre-compensation value. The frequency of the reference signal may have been adjusted upward (e.g., if the UE 115 is moving away from the first TRP 205) or downward (e.g., if the UE 115 is moving toward the first TRP 205).

At block 810, the UE 115 receives the reference signal (e.g., a TRS) modified by the second frequency pre-compensation value. The frequency of the reference signal may have been adjusted upward (e.g., if the UE 115 is moving away from the second TRP 205) or downward (e.g., if the UE 115 is moving toward the second TRP 205). The UE 115 may receive the first and second reference signals (e.g., which have the same identifier and are sent on the same time/frequency resources as part of the SFN) at the same time, such that the actions of blocks 808 and 810 occur at approximately the same time.

At block 812, the UE 115 performs channel estimation based on the TRS received at blocks 808 and 810. The UE 115 may determine a channel state based on the TRS and/or determine parameters for further communication with the BS 105.

At decision block 814, if there is a change in the SFN due to, for example, a change in the UE 115's position or velocity, the UE 115 may report the change to the BS 105 and return to block 802 to repeat aspects method 800 based on the new SFN characteristics. As another example, if a different aspect of the SFN changes, for example, the beam characteristics used by either or both TRPs 205 to transmit the reference signal, the method 800 may return to block 802 to repeat aspects of method 800. Some or all aspects of the method 800 may be repeated. For example, if only characteristics of one of the TRPs 205 change, only aspects of the method related to that TRP 205 may be repeated. Alternately, if no change to the SFN occurs, the method progresses to block 820 where the UE will maintain the range of the tracking loop for TRSs.

In some embodiments, the UE 115 may additionally or alternatively perform aspects of the method 800 in relation to other types of signals. For example, the UE 115 may receive synchronization signals and signals carrying system information, and/or SSBs, with frequency pre-compensation applied. The UE 115 may also receive indications of the frequency pre-compensation values applied to other types of signals. For example, primary synchronization and/or secondary synchronization signals may also be frequency pre-compensated on a per-beam, per-panel, or per-TRP basis to enable meaningful reception by the UE 115 (as discussed with respect to the other embodiments herein). Moreover, the coarse-level pre-adjustment may be conveyed as system information.

Further aspects of the present disclosure include the following:

1. A method of wireless communications, comprising:
    determining, by a base station, a frequency pre-compensation value for a transmission and reception point (TRP) on a single frequency network (SFN);
    indicating, by the base station to a user equipment (UE), the frequency pre-compensation value via the TRP; and
    applying, by the base station, the frequency pre-compensation value to a signal for transmission by the TRP to the UE.

2. The method of aspect 1, wherein the signal comprises a first signal, and the frequency pre-compensation value comprises a first frequency pre-compensation value associated with a first Transmission Configuration Indicator (TCI) state, further comprising:
    determining, by the base station, a second frequency pre-compensation value for the TRP associated with a second TCI state; and
    applying, by the base station, the second frequency pre-compensation value to a second signal for transmission by the TRP to the UE.

3. The method of aspect 1, wherein the TRP comprises a first TRP and the frequency pre-compensation value comprises a first frequency pre-compensation value, the method further comprising:
    determining, by the base station, a second frequency pre-compensation value for a second TRP on the SFN for use with the signal;
    indicating, by the base station, the second frequency pre-compensation value to the UE via the first TRP or the second TRP; and
    applying, by the base station, the second frequency pre-compensation value to the signal for transmission by the second TRP to the UE.

4. The method of any of aspects 1-3, wherein an indication of the frequency pre-compensation value is included, by the base station, in a downlink control information (DCI) message.

5. The method of any of aspects 1-4, wherein the frequency pre-compensation value is determined based on a frequency measurement of a reference signal from the UE.

6. The method of any of aspects 1-4, wherein the frequency pre-compensation value is determined based on a frequency measurement of a reference signal from the base station.

7. The method of any of aspects 1-6, further comprising:
    updating, by the base station, the frequency pre-compensation value in response to a change in the SFN; and
    indicating, by the base station to the UE, the updated frequency pre-compensation value via the TRP.

8. A method of wireless communications, comprising:
    receiving, by a user equipment (UE) on a single frequency network (SFN), an indication of a frequency pre-compensation value for use by a transmission and reception point (TRP);
    receiving, by the UE, a signal modified by the frequency pre-compensation value;
    narrowing, by the UE, a range of a tracking loop based on the indicated frequency pre-compensation value; and
    performing, by the UE, channel estimation of the signal based on the narrowed tracking loop.

9. The method of aspect 8, wherein the signal comprises a first signal, and the indication of a frequency pre-compensation value comprises a first indication of a first frequency pre-compensation value associated with a first Transmission Configuration Indicator (TCI) state, further comprising:
    receiving, by the UE from the TRP, a second indication of a second frequency pre-compensation value associated with a second TCI state for use by the TRP; and
    receiving, by the UE from the TRP, a second signal modified by the second frequency pre-compensation value;
    wherein the narrowing is further based on the second indicated frequency pre-compensation value.

10. The method of aspect 8, wherein the TRP comprises a first TRP, the receiving the signal further comprising receiving the signal from a second TRP as well as the first TRP.

11. The method of aspect 10, wherein the frequency pre-compensation value comprises a first frequency pre-compensation value, the receiving the frequency pre-compensation value further comprising:
    receiving, by the UE from a second TRP, an indication of a second frequency pre-compensation value for use by the second TRP.

12. The method of either aspect 9 or 11, wherein the narrowing is based on the second frequency pre-compensation value as well as the first frequency pre-compensation value.

13. The method of any of aspects 8-12, wherein the indication is part of a downlink control information (DCI) message.

14. The method of any of aspects 8-13, wherein the frequency pre-compensation value is determined based on a frequency measurement of a reference signal from the UE.

15. The method of any of aspects 8-13, wherein the frequency pre-compensation value is determined based on a frequency measurement of a reference signal from the TRP.

16. A base station, comprising:
a memory;
a transceiver; and
a processor coupled with the memory and the transceiver and configured, when executing instructions stored on the memory, to cause the base station to:
determine a frequency pre-compensation value for a transmission and reception point (TRP) on a single frequency network (SFN);
indicate to a user equipment (UE) the frequency pre-compensation value via the TRP; and
apply the frequency pre-compensation value to a signal for transmission by the TRP to the UE.

17. The base station of aspect 16, wherein the signal comprises a first signal, and the frequency pre-compensation value comprises a first frequency pre-compensation value associated with a first Transmission Configuration Indicator (TCI) state, the transceiver and the processor further configured to:
determine a second frequency pre-compensation value for the TRP associated with a second TCI state; and
apply the second frequency pre-compensation value to a second signal for transmission by the TRP to the UE.

18. The base station of aspect 16, wherein the TRP comprises a first TRP, the frequency pre-compensation value comprises a first frequency pre-compensation value, and the transceiver and the processor re further configured to:
determine a second frequency pre-compensation value for a second TRP on the SFN for use with the signal;
indicate the second frequency pre-compensation value to the UE via the first TRP or the second TRP; and
apply the second frequency pre-compensation value to the signal for transmission by the second TRP to the UE.

19. The base station of any of aspects 16-18, wherein the transceiver and the processor are configured to indicate the frequency pre-compensation value by:
including an indication of the frequency pre-compensation value in a downlink control information (DCI) message.

20. The base station of any of aspects 16-19, wherein the transceiver and the processor are configured to determine the frequency pre-compensation value by:
estimating the frequency pre-compensation value based on a measurement, by the TRP, of a reference signal from the UE.

21. The base station of any of aspects 16-19, wherein the transceiver and the processor are configured to determine the frequency pre-compensation value by:
estimating the frequency pre-compensation value based on a measurement, by the UE, of a reference signal from the base station.

22. The base station of any of aspects 16-21, wherein the transceiver and the processor are further configured to:
update the frequency pre-compensation value in response to a change in the SFN; and indicate to the UE the updated frequency pre-compensation value via the TRP.

23. A user equipment (UE), comprising:
a memory;
a transceiver; and
a processor coupled with the memory and the transceiver and configured, when executing instructions stored on the memory, to cause the UE to:
receive on a single frequency network (SFN) an indication of a frequency pre-compensation value for use by a transmission and reception point (TRP);
receive a signal modified by the frequency pre-compensation value; narrow range of a tracking loop based on the indicated frequency pre-compensation value; and
perform channel estimation of the signal based on the narrowed tracking loop.

24. The UE of aspect 23, wherein the signal comprises a first signal, and the indication of a frequency pre-compensation value comprises a first indication of a first frequency pre-compensation value associated with a first Transmission Configuration Indicator (TCI) state, the transceiver and the processor further configured to:
receive, from the TRP, a second indication of a second frequency pre-compensation value associated with a second TCI state for use by the TRP; and
receive, from the TRP, a second signal modified by the second frequency pre-compensation value; and
narrow range of the tracking loop further based on the second indicated frequency pre-compensation value.

25. The UE of aspect 23, wherein the TRP comprises a first TRP, and the transceiver and the processor are configured to receive the signal by receiving the signal from a second TRP as well as the first TRP.

26. The UE of aspect 25, wherein the frequency pre-compensation value comprises a first frequency pre-compensation value, and the transceiver and the processor are further configured to receive an indication of a second frequency pre-compensation value from the second TRP.

27. The UE of either aspect 24 or 26, wherein the narrowing is based on the second frequency pre-compensation value as well as the first frequency pre-compensation value.

28. The UE of any of aspects 23-27, wherein the indication is part of a downlink control information (DCI) message.

29. The UE of any of aspects 23-28, wherein the frequency pre-compensation value is determined based on a frequency measurement, by the TRP, of a reference signal from the UE.

30. The UE of any of aspects 23-28, wherein the frequency pre-compensation value is determined based on a frequency measurement, by the UE, of a reference signal from the TRP.

31. A method of wireless communications, comprising:
determining, by a base station, a frequency pre-compensation value for a transmission and reception point (TRP) on a single frequency network (SFN);
indicating, by the base station to a user equipment (UE), the frequency pre-compensation value via the TRP;
applying, by the base station, the frequency pre-compensation value to a signal; and
directing, by the base station, the TRP to transmit the signal with the applied pre-compensation value to the UE.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communications, comprising:
   determining, by a base station, a frequency pre-compensation value for a transmission and reception point (TRP) on a single frequency network (SFN);
   indicating, by the base station to a user equipment (UE), the frequency pre-compensation value via the TRP; and
   applying, by the base station, the frequency pre-compensation value to a signal for transmission by the TRP to the UE.

2. The method of claim 1, wherein the signal comprises a first signal, and the frequency pre-compensation value comprises a first frequency pre-compensation value associated with a first Transmission Configuration Indicator (TCI) state, further comprising:
   determining, by the base station, a second frequency pre-compensation value for the TRP associated with a second TCI state; and
   applying, by the base station, the second frequency pre-compensation value to a second signal for transmission by the TRP to the UE.

3. The method of claim 1, wherein the TRP comprises a first TRP and the frequency pre-compensation value comprises a first frequency pre-compensation value, the method further comprising:
   determining, by the base station, a second frequency pre-compensation value for a second TRP on the SFN for use with the signal;
   indicating, by the base station, the second frequency pre-compensation value to the UE via the first TRP or the second TRP; and
   applying, by the base station, the second frequency pre-compensation value to the signal for transmission by the second TRP to the UE.

4. The method of claim 1, wherein an indication of the frequency pre-compensation value is included, by the base station, in a downlink control information (DCI) message.

5. The method of claim 1, wherein the frequency pre-compensation value is determined based on a frequency measurement of a reference signal from the UE.

6. The method of claim 1, wherein the frequency pre-compensation value is determined based on a frequency measurement of a reference signal from the base station.

7. The method of claim 1, further comprising:
   updating, by the base station, the frequency pre-compensation value in response to a change in the SFN; and
   indicating, by the base station to the UE, the updated frequency pre-compensation value via the TRP.

8. A method of wireless communications, comprising:
   receiving, by a user equipment (UE) on a single frequency network (SFN), an indication of a frequency pre-compensation value for used by a transmission and reception point (TRP);
   receiving, by the UE, a signal modified by the frequency pre-compensation value;
   narrowing, by the UE, a range of a tracking loop based on the indicated frequency pre-compensation value; and
   performing, by the UE, channel estimation of the signal based on the narrowed tracking loop.

9. The method of claim 8, wherein the signal comprises a first signal, and the indication of a frequency pre-compensation value comprises a first indication of a first frequency pre-compensation value associated with a first Transmission Configuration Indicator (TCI) state, further comprising:
   receiving, by the UE from the TRP, a second indication of a second frequency pre-compensation value associated with a second TCI state for use by the TRP; and
   receiving, by the UE from the TRP, a second signal modified by the second frequency pre-compensation value;
   wherein the narrowing is further based on the second indicated frequency pre-compensation value.

10. The method of claim 8, wherein the TRP comprises a first TRP, the receiving the signal further comprising receiving the signal from a second TRP as well as the first TRP.

11. The method of claim 10, wherein the frequency pre-compensation value comprises a first frequency pre-compensation value, the receiving the frequency pre-compensation value further comprising:
    receiving, by the UE from a second TRP, an indication of a second frequency pre-compensation value for use by the second TRP.

12. The method of claim 11, wherein the narrowing is based on the second frequency pre-compensation value as well as the first frequency pre-compensation value.

13. The method of claim 8, wherein the indication is part of a downlink control information (DCI) message.

14. The method of claim 8, wherein the frequency pre-compensation value is determined based on a frequency measurement of a reference signal from the UE.

15. The method of claim 8, wherein the frequency pre-compensation value is determined based on a frequency measurement of a reference signal from the TRP.

16. A base station, comprising:
a memory;
a transceiver; and
a processor coupled with the memory and the transceiver and configured, when executing instructions stored on the memory, to cause the base station to:
   determine a frequency pre-compensation value for a transmission and reception point (TRP) on a single frequency network (SFN);
   indicate to a user equipment (UE) the frequency pre-compensation value via the TRP; and
   apply the frequency pre-compensation value to a signal for transmission by the TRP to the UE.

17. The base station of claim 16, wherein the signal comprises a first signal, and the frequency pre-compensation value comprises a first frequency pre-compensation value associated with a first Transmission Configuration Indicator (TCI) state, the transceiver and the processor further configured to:
   determine a second frequency pre-compensation value for the TRP associated with a second TCI state; and
   apply the second frequency pre-compensation value to a second signal for transmission by the TRP to the UE.

18. The base station of claim 16, wherein the TRP comprises a first TRP, the frequency pre-compensation value comprises a first frequency pre-compensation value, and the transceiver and the processor are further configured to:
   determine a second frequency pre-compensation value for a second TRP on the SFN for use with the signal;
   indicate the second frequency pre-compensation value to the UE via the first TRP or the second TRP; and
   apply the second frequency pre-compensation value to the signal for transmission by the second TRP to the UE.

19. The base station of claim 16, wherein the transceiver and the processor are configured to indicate the frequency pre-compensation value by:
   including an indication of the frequency pre-compensation value in a downlink control information (DCI) message.

20. The base station of claim 16, wherein the transceiver and the processor are configured to determine the frequency pre-compensation value by:
   estimating the frequency pre-compensation value based on a measurement, by the TRP, of a reference signal from the UE.

21. The base station of claim 16, wherein the transceiver and the processor are configured to determine the frequency pre-compensation value by:
   estimating the frequency pre-compensation value based on a measurement, by the UE, of a reference signal from the base station.

22. The base station of claim 16, wherein the transceiver and the processor are further configured to:
   update the frequency pre-compensation value in response to a change in the SFN; and
   indicate to the UE the updated frequency pre-compensation value via the TRP.

23. A user equipment (UE), comprising:
a memory;
a transceiver; and
a processor coupled with the memory and the transceiver and configured, when executing instructions stored on the memory, to cause the UE to:
   receive on a single frequency network (SFN) an indication of a frequency pre-compensation value for use by a transmission and reception point (TRP);
   receive a signal modified by the frequency pre-compensation value;
   narrow range of a tracking loop based on the indicated frequency pre-compensation value; and
   perform channel estimation of the signal based on the narrowed tracking loop.

24. The UE of claim 23, wherein the signal comprises a first signal, and the indication of a frequency pre-compensation value comprises a first indication of a first frequency pre-compensation value associated with a first Transmission Configuration Indicator (TCI) state, the transceiver and the processor further configured to:
   receive, from the TRP, a second indication of a second frequency pre-compensation value associated with a second TCI state for use by the TRP; and
   receive, from the TRP, a second signal modified by the second frequency pre-compensation value; and
   narrow range of the tracking loop further based on the second indicated frequency pre-compensation value.

25. The UE of claim 23, wherein the TRP comprises a first TRP, and the transceiver and the processor are configured to receive the signal by receiving the signal from a second TRP as well as the first TRP.

26. The UE of claim 25, wherein the frequency pre-compensation value comprises a first frequency pre-compensation value, and the transceiver and the processor are further configured to receive an indication of a second frequency pre-compensation value from the second TRP.

27. The UE of claim 26, wherein the narrowing is based on the second frequency pre-compensation value as well as the first frequency pre-compensation value.

28. The UE of claim 23, wherein the indication is part of a downlink control information (DCI) message.

29. The UE of claim 23, wherein the frequency pre-compensation value is determined based on a frequency measurement, by the TRP, of a reference signal from the UE.

30. The UE of claim 23, wherein the frequency pre-compensation value is determined based on a frequency measurement, by the UE, of a reference signal from the TRP.

* * * * *